(12) United States Patent
Maruta

(10) Patent No.: US 10,618,529 B2
(45) Date of Patent: Apr. 14, 2020

(54) VEHICLE MONITORING SYSTEM, MANAGEMENT DEVICE AND MONITORING METHOD

(71) Applicant: HITACHI KOKUSAI ELECTRIC INC., Tokyo (JP)

(72) Inventor: Satoshi Maruta, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 0 days.

(21) Appl. No.: 16/335,714

(22) PCT Filed: Sep. 26, 2016

(86) PCT No.: PCT/JP2016/078298
§ 371 (c)(1),
(2) Date: Mar. 22, 2019

(87) PCT Pub. No.: WO2018/055774
PCT Pub. Date: Mar. 29, 2018

(65) Prior Publication Data
US 2019/0248383 A1 Aug. 15, 2019

(51) Int. Cl.
*B61B 1/02* (2006.01)
*B61D 19/02* (2006.01)
(Continued)

(52) U.S. Cl.
CPC ............ *B61B 1/02* (2013.01); *B60R 1/06* (2013.01); *B61D 19/02* (2013.01); *B61K 13/04* (2013.01);
(Continued)

(58) Field of Classification Search
CPC .. B61B 1/02; B60R 1/06; B61D 19/02; B61K 13/04; B61L 15/0072; B61L 15/009; H04N 7/18; H04N 7/181; H04N 21/214
See application file for complete search history.

(56) References Cited

U.S. PATENT DOCUMENTS

| 5,950,543 A | * | 9/1999 | Oster | ..................... B61B 13/10 |
| | | | | 104/130.05 |
| 10,315,672 B2 | * | 6/2019 | Beyer | ................ G06K 9/00771 |

(Continued)

FOREIGN PATENT DOCUMENTS

| JP | 2011-205582 A | 10/2011 |
| JP | 2011-240846 A | 12/2011 |

(Continued)

OTHER PUBLICATIONS

International Search Report of PCT/JP2016/078298 dated Dec. 20, 2016. 2 pages.

*Primary Examiner* — Behrang Badii
*Assistant Examiner* — Daniel L Greene
(74) *Attorney, Agent, or Firm* — Mattingly & Malur, PC

(57) ABSTRACT

The vehicle monitoring system includes a plurality of cameras provided corresponding to a plurality of doors provided on both sides (A side and B side) of each vehicle, and a management device for determining a camera corresponding to an open door. The management device determines a camera whose initial position is on the B side as the display use camera to be used for display, with respect to a vehicle in which the initial position of the door open camera corresponding to the open door identified by the open door identification information, and the door opening-side information match with the B side. With respect to a vehicle in which the initial position of the door open camera and the door opening-side information do not match with the B side, the management device determines a camera whose initial position is on the A side as the display use camera.

7 Claims, 10 Drawing Sheets

(51) Int. Cl.
*H04N 7/18* (2006.01)
*H04N 21/214* (2011.01)
*B60R 1/06* (2006.01)
*B61L 15/00* (2006.01)
*B61K 13/04* (2006.01)

(52) U.S. Cl.
CPC ......... *B61L 15/009* (2013.01); *B61L 15/0072* (2013.01); *H04N 7/18* (2013.01); *H04N 7/181* (2013.01); *H04N 21/214* (2013.01)

(56) References Cited

U.S. PATENT DOCUMENTS

| | | | | |
|---|---|---|---|---|
| 2003/0222981 | A1* | 12/2003 | Kisak | B61L 15/0027 348/148 |
| 2006/0027133 | A1* | 2/2006 | Suematsu | B61B 1/00 104/27 |
| 2008/0103648 | A1* | 5/2008 | Kanner | B61L 29/243 701/19 |
| 2008/0195257 | A1* | 8/2008 | Rauch | B61B 1/02 701/1 |
| 2008/0198228 | A1* | 8/2008 | Rizk | B60R 1/008 348/148 |
| 2010/0020175 | A1* | 1/2010 | Takada | H04N 5/76 348/148 |
| 2010/0251924 | A1* | 10/2010 | Taylor | B61D 7/30 105/286 |
| 2011/0161119 | A1* | 6/2011 | Collins | G06Q 40/08 705/4 |
| 2013/0058253 | A1 | 3/2013 | Maruta et al. | |
| 2013/0125778 | A1* | 5/2013 | LaCabe | B61B 13/00 104/130.01 |
| 2013/0344802 | A1* | 12/2013 | Armour | H04W 84/005 455/39 |
| 2015/0070131 | A1* | 3/2015 | Beaurepaire | G08G 1/005 340/5.8 |
| 2016/0162739 | A1* | 6/2016 | Ishiguri | B61L 99/00 348/148 |
| 2017/0013237 | A1* | 1/2017 | Ito | B61D 49/00 |
| 2017/0050652 | A1* | 2/2017 | Beyer | G06K 9/00771 |
| 2019/0073842 | A1* | 3/2019 | Lee | H04W 12/06 |

FOREIGN PATENT DOCUMENTS

| | | |
|---|---|---|
| JP | 2012-217088 A | 11/2012 |
| JP | 2013-184610 A | 9/2013 |
| WO | 2011/148847 A1 | 12/2011 |
| WO | 2015/141586 A1 | 9/2015 |
| WO | 2015/145736 A1 | 10/2015 |
| WO | 2015/146641 A1 | 10/2015 |
| WO | 2016/051504 A1 | 4/2016 |
| WO | 2016/121374 A1 | 8/2016 |

* cited by examiner

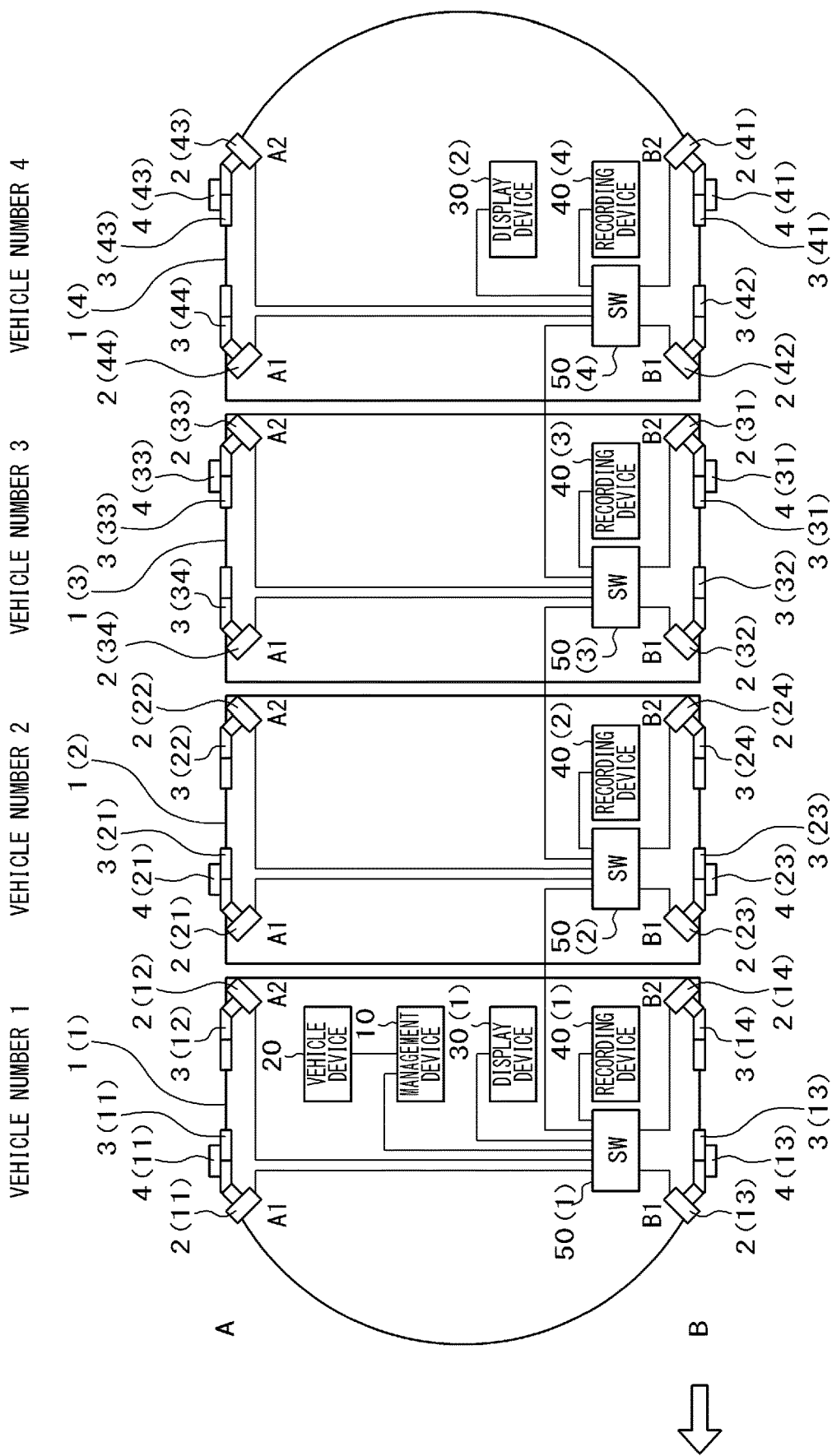

| VEHICLE INFORMATION | |
|---|---|
| FIRST VEHICLE (TRAVELING DIRECTION) | VEHICLE NUMBER 1 |
| DOOR OPENING SIDE | B |

12b

| VEHICLE NUMBER 1 | | | | | | USE CAMERA POSITION |
|---|---|---|---|---|---|---|
| DEVICE NAME | IP ADDRESS | INITIAL POSITION INFORMATION | CURRENT POSITION | VEHICLE SIDE LAMP (ON:1, OFF:0) | LOGICAL POSITION INFORMATION | |
| CAMERA 11 | 192.168.1.100 | A1 | A1 | 0 | A1 | — |
| CAMERA 12 | 192.168.1.101 | A2 | A2 | 0 | A2 | — |
| CAMERA 13 | 192.168.1.102 | B1 | B1 | 1 | B1 | VEHICLE 1-B1 |
| CAMERA 14 | 192.168.1.103 | B2 | B2 | 0 | B2 | VEHICLE 1-B2 |

| VEHICLE NUMBER 2 | | | | | | USE CAMERA POSITION |
|---|---|---|---|---|---|---|
| DEVICE NAME | IP ADDRESS | INITIAL POSITION INFORMATION | CURRENT POSITION | VEHICLE SIDE LAMP (ON:1, OFF:0) | LOGICAL POSITION INFORMATION | |
| CAMERA 21 | 192.168.1.106 | A1 | A1 | 0 | A1 | — |
| CAMERA 22 | 192.168.1.107 | A2 | A2 | 0 | A2 | — |
| CAMERA 23 | 192.168.1.108 | B1 | B1 | 1 | B1 | VEHICLE 2-B1 |
| CAMERA 24 | 192.168.1.109 | B2 | B2 | 0 | B2 | VEHICLE 2-B2 |

| VEHICLE NUMBER 3 | | | | | | USE CAMERA POSITION |
|---|---|---|---|---|---|---|
| DEVICE NAME | IP ADDRESS | INITIAL POSITION INFORMATION | CURRENT POSITION | VEHICLE SIDE LAMP (ON:1, OFF:0) | LOGICAL POSITION INFORMATION | |
| CAMERA 31 | 192.168.1.111 | A1 | B2 | 1 | B2 | VEHICLE 3-B2 |
| CAMERA 32 | 192.168.1.112 | A2 | B1 | 0 | B1 | VEHICLE 3-B1 |
| CAMERA 33 | 192.168.1.113 | B1 | A2 | 0 | A2 | — |
| CAMERA 34 | 192.168.1.114 | B2 | A1 | 0 | A1 | — |

| VEHICLE NUMBER 4 | | | | | | USE CAMERA POSITION |
|---|---|---|---|---|---|---|
| DEVICE NAME | IP ADDRESS | INITIAL POSITION INFORMATION | CURRENT POSITION | VEHICLE SIDE LAMP (ON:1, OFF:0) | LOGICAL POSITION INFORMATION | |
| CAMERA 41 | 192.168.1.116 | A1 | B2 | 1 | B2 | VEHICLE 4-B2 |
| CAMERA 42 | 192.168.1.117 | A2 | B1 | 0 | B1 | VEHICLE 4-B1 |
| CAMERA 43 | 192.168.1.118 | B1 | A2 | 0 | A2 | — |
| CAMERA 44 | 192.168.1.119 | B2 | A1 | 0 | A1 | — |

| VEHICLE NUMBER 1 | |
|---|---|
| DEVICE NAME | IP ADDRESS |
| CAMERA 11 | 192.168.1.100 |
| CAMERA 12 | 192.168.1.101 |
| CAMERA 13 | 192.168.1.102 |
| CAMERA 14 | 192.168.1.103 |
| RECORDING DEVICE 40(1) | 192.168.1.104 |
| DISPLAY DEVICE 30(1) | 192.168.1.105 |
| MANAGEMENT DEVICE 110(1) | 192.168.1.200 |
| SW 50(1) | - |

| VEHICLE NUMBER 2 | |
|---|---|
| DEVICE NAME | IP ADDRESS |
| CAMERA 21 | 192.168.1.106 |
| CAMERA 22 | 192.168.1.107 |
| CAMERA 23 | 192.168.1.108 |
| CAMERA 24 | 192.168.1.109 |
| RECORDING DEVICE 40(2) | 192.168.1.110 |
| SW 50(2) | - |

| VEHICLE NUMBER 3 | |
|---|---|
| DEVICE NAME | IP ADDRESS |
| CAMERA 31 | 192.168.1.111 |
| CAMERA 32 | 192.168.1.112 |
| CAMERA 33 | 192.168.1.113 |
| CAMERA 34 | 192.168.1.114 |
| RECORDING DEVICE 40(3) | 192.168.1.115 |
| SW 50(3) | - |

| VEHICLE NUMBER 4 | |
|---|---|
| DEVICE NAME | IP ADDRESS |
| CAMERA 41 | 192.168.1.116 |
| CAMERA 42 | 192.168.1.117 |
| CAMERA 43 | 192.168.1.118 |
| CAMERA 44 | 192.168.1.119 |
| RECORDING DEVICE 40(4) | 192.168.1.120 |
| DISPLAY DEVICE 30(2) | 192.168.1.121 |
| SW 50(4) | - |

FIG. 9

| 210 |
| --- |
| VEHICLE INFORMATION |

| FIRST VEHICLE (TRAVELING DIRECTION) | VEHICLE NUMBER 1 |
| --- | --- |
| DOOR OPENING SIDE | B |

| VEHICLE NUMBER 1 | | | USE CAMERA POSITION |
| --- | --- | --- | --- |
| DEVICE NAME | IP ADDRESS | INITIAL POSITION INFORMATION | |
| CAMERA 11 | 192.168.1.100 | A1 | – |
| CAMERA 12 | 192.168.1.101 | A2 | – |
| CAMERA 13 | 192.168.1.102 | B1 | VEHICLE 1-B1 |
| CAMERA 14 | 192.168.1.103 | B2 | VEHICLE 1-B2 |

| VEHICLE NUMBER 2 | | | USE CAMERA POSITION |
| --- | --- | --- | --- |
| DEVICE NAME | IP ADDRESS | INITIAL POSITION INFORMATION | |
| CAMERA 21 | 192.168.1.106 | A1 | – |
| CAMERA 22 | 192.168.1.107 | A2 | – |
| CAMERA 23 | 192.168.1.108 | B1 | VEHICLE 2-B1 |
| CAMERA 24 | 192.168.1.109 | B2 | VEHICLE 2-B2 |

| VEHICLE NUMBER 3 | | | USE CAMERA POSITION |
| --- | --- | --- | --- |
| DEVICE NAME | IP ADDRESS | INITIAL POSITION INFORMATION | |
| CAMERA 31 | 192.168.1.111 | A1 | – |
| CAMERA 32 | 192.168.1.112 | A2 | – |
| CAMERA 33 | 192.168.1.113 | B1 | VEHICLE 3-B1 |
| CAMERA 34 | 192.168.1.114 | B2 | VEHICLE 3-B2 |

| VEHICLE NUMBER 4 | | | USE CAMERA POSITION |
| --- | --- | --- | --- |
| DEVICE NAME | IP ADDRESS | INITIAL POSITION INFORMATION | |
| CAMERA 41 | 192.168.1.116 | A1 | – |
| CAMERA 42 | 192.168.1.117 | A2 | – |
| CAMERA 43 | 192.168.1.118 | B1 | VEHICLE 4-B1 |
| CAMERA 44 | 192.168.1.119 | B2 | VEHICLE 4-B2 |

201   202   203   205

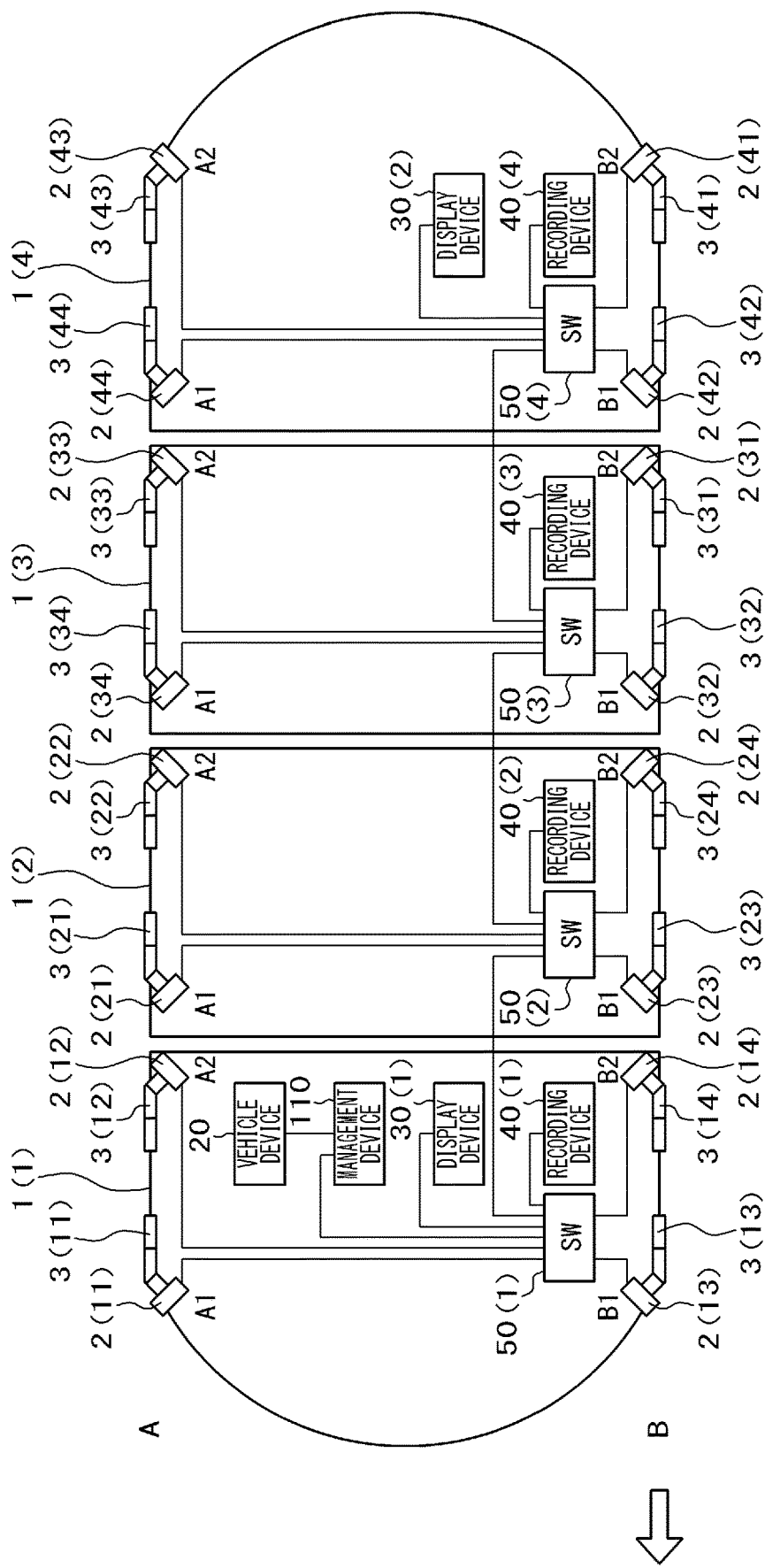

VEHICLE MONITORING SYSTEM, MANAGEMENT DEVICE AND MONITORING METHOD

TECHNICAL FIELD

The present invention relates to a technique for displaying images captured by a camera in the vehicle door vicinity when the vehicle door opens and closes.

BACKGROUND ART

Recently, for example, a vehicle monitoring system including a monitoring camera, a recording device for recording an image of the monitoring camera, a network switch, a display device, and the like, has been operated in a rail vehicle to monitor the opening and closing state of a vehicle door by displaying the image on the display device, and record image data in the recording device.

FIG. 7 is a diagram showing the configuration of a vehicle monitoring system according to the background art, which is a top view (an overhead view). The operation method of the vehicle monitoring system of the background art will be described with reference to FIG. 7. As shown in FIG. 7, this train has four vehicles 1(1) to 1(4). The vehicle numbers of the vehicles 1(1) to 1(4) are 1 to 4, respectively. The vehicle numbers are the identifiers that identify the vehicles 1(1) to 1(4) with each other.

In the example of FIG. 7, the vehicle 1(1) includes four cameras 2(11) to 2(14), a vehicle device 20, a management device 110, a display device 30(1), a recording device 40(1), and a network switch (hereinafter, simply referred to as a switch or SW) 50(1). The vehicle 1(2) includes four cameras 2(21) to 2(24), a recording device 40(2), and a switch 50(2). The vehicle 1(3) includes four cameras 2(31) to 2(34), a recording device 40(3), and a switch 50(3). The vehicle 1(4) includes four cameras 2(41) to 2(44), a display device 30(2), a recording device 40(4), and a switch 50(4).

The vehicles 1(1) to 1(4) are collectively referred to as vehicle(s) 1. The cameras 2(11) to 2(44) are cameras with the same function, which are collectively referred to as camera(s) 2. The display devices 30(1) and 30(2) are display devices with the same function, which are collectively referred to as display device(s) 30. The recording devices 40(1) to 40(4) are recording devices with the same function, which are collectively referred to as recording device(s) 40.

The cameras 2(11) to 2(44) are provided outside the vehicle 1 so as to correspond to vehicle doors (hereinafter also simply referred to as doors) 3(11) to 3(44), respectively, to capture the vehicle outside, such as the station platform near the vehicle door 3 when the train stops at the station platform. The captured image data is displayed either one or both of the display devices 30(1) and 30(2), with which the train driver or conductor confirms safety on the station platform. The vehicle doors 3(11) to 3(44) are correctively referred to as vehicle door(s) 3. Note that in order to simplify the description, the cameras 2(11) to 2(44) may also be referred to as camera 11 to camera 44, respectively.

In FIG. 7, an arrow 71 indicates the train traveling direction. Further, the A side in FIG. 7 is the right side viewed in the train traveling direction, and the B side is the left side. Further, in FIG. 7, the positions of the cameras 2 and the doors 3 in each vehicle 1 are represented by A1, A2, B1, and B2. For example, in the vehicle 1(1), the positions of the cameras 2 on the A side are represented by A1 and A2, and the positions of the cameras 2 on the B side are represented by B1 and B2, in order from front to back in the traveling direction. More specifically, the position of the camera 2(11) is represented by A1, the position of the camera 2(12) is represented by A2, the position of the camera 2(13) is represented by B1, and the position of the camera 2(14) is represented by B2.

Also in the vehicles 1(2) to 1(4), similarly to the vehicle 1(1), the positions of the cameras 2 on the A side are represented by A1 and A2, and the positions of the cameras 2 on the B side are represented by B1 and B2 in order from front to back in the traveling direction. Note that in the example of FIG. 7, there are two cameras 2 and two doors 3 on one side, so that the positions of the cameras 2 in each vehicle 1 are represented by A1, A2, B1, and B2. However, when the number of cameras 2 is three, the positions of the cameras 2 on the A side and on the B side are similarly shown in an ascending order from the top in the traveling direction, respectively. For example, when there are three cameras 2 on one side, the positions of the cameras 2 in each vehicle 1 are represented by A1, A2, A3, B1, B2, and B3.

These camera positions (A1, A2, B1, and B2) are absolute and constant even when vehicle direction change takes place in some of the vehicles 1, which will be described below.

A unique IP (Internet Protocol) address is assigned to each of the devices (camera 2, vehicle device 20, management device 110, display device 30, and recording device 40). For example, different IP addresses are assigned in a network group of 192.168.1.9/24.

FIG. 8 is a diagram showing the IP address of each device according to the background art. Each device having its IP address stores the IP addresses of other devices to be communicated with and can communicate with the respective devices of the vehicle the particular device belongs to and with the respective devices of the other vehicles. The IP addresses of the source and the destination (address) are included in the communication information exchanged among the devices.

The switch 50 stores the IP address of each device. When receiving communication information from each device, the switch 50 delivers the received communication information to the destination device included in the communication information, or to the switch 50 to which the destination device is connected.

For example, the display device 30(1) can receive and obtain data from the management device 110 and cameras 2(11) to 2(14) of the vehicle 1(1) through the switch 50(1). Further, the display device 30(1) can receive and obtain data from the cameras 2(21) to 2(24) of the vehicle 1(2) through the switch 50(1) and the switch 50(2).

The vehicle device 20 controls train services, such as, for example, running and stopping the train, opening and closing the vehicle door 3, and air conditioning. The vehicle device 20 notifies the management device 100 of train movement start information that indicates the start of the train movement, train stop information that indicates the stopping of the train, and train traveling direction information that indicates the traveling direction of the train. The train traveling direction information is, for example, the first vehicle information indicating the first vehicle in the train traveling direction. Further, the vehicle device 20 notifies the management device 110 of which of the doors either on the A side or the B side will open, as door opening-side information.

The management device 110 previously stores the IP addresses of the camera 2, the recording device 40, and the display device 30 for one train unit (vehicles with vehicle numbers 1 to 4) into a database, and manages the data stored in the database. When receiving train movement start information and train stop information from the vehicle device 20, the management device 110 notifies the display device 30 of the received information.

When the train stops at the station platform and the vehicle door 3 is opened, namely, upon receiving train stop information from the management device 110, the display device 30 selects the camera 2 on the side on which the vehicle door 3 is opened (namely, on the station platform side) and displays the image taken by the selected camera 2.

Next, the method by which the display device 30 selects the camera 2 will be described with reference to FIG. 9. FIG. 9 is a diagram showing the use camera determination method according to the background art.

Reference numeral 210 in FIG. 9 denotes the vehicle information that the management device 110 received from the vehicle device 20 and stored, including first vehicle information (namely, train traveling direction information) and door opening-side information. In the example of FIG. 9, the first vehicle corresponds to the vehicle with vehicle number 1 (vehicle 1(1) in FIG. 7), and the door opening side is the B side in FIG. 7.

Reference numerals 201 and 202 in FIG. 9 denote the IP addresses corresponding to each camera 2 as described in FIG. 8. Reference numeral 203 in FIG. 9 denotes the initial position information indicating the position (initial position) of each camera 2 in the train configuration. In the example of FIG. 9, the initial positions of the camera 11 to camera 14, camera 21 to camera 24, camera 31 to camera 34, and camera 41 to camera 44 are A1, A2, B1, and B2, respectively.

Reference numeral 205 in FIG. 9 denotes the result that the management device 110 determines which camera is capturing the opened vehicle door 3. In other words, upon receiving the train stop information and the door opening-side information from the vehicle device 20, the management device 110 determines that the camera 2 located on the door opening side (B side in the example of FIG. 9) as the camera to be used for display, based on the door opening-side information and on the initial position information. In the example of FIG. 9, the management device 110 determines camera 13 and camera 14, camera 23 and camera 24, and camera 43 and camera 44 as the cameras (use cameras) to be used for display.

Then, the management device 110 stores the use camera position information, which is the use camera determination result, into the database. For example, the management device 110 determines the cameras 13 and 14, the initial position information of which are respectively B1 and B2, are the cameras 2 to be used in the vehicle 1(1). Then, the management device 110 associates the vehicle 1-B1 and the vehicle 1-B2, respectively, with the camera 13 and the camera 14, and stores the associated data.

When receiving the train stop information from the management device 110, the display device 30(1) refers to the database of the management device 110 to obtain the IP address of the camera 2 that is determined as the use camera. Then, the display device 30(1) obtains live image data from the camera 2 determined as the use camera by using the obtained IP address, and displays the obtained live image data.

The following Patent Literature 1 discloses a vehicle monitoring system including a monitoring camera and a display device to configure a network by using IP addresses.

CITATION LIST

Patent Literature

PTL 1: Japanese Patent Application Laid-Open No. 2011-205582

SUMMARY OF INVENTION

Technical Problem

Incidentally, of a plurality of vehicles configuring a train, some vehicles may change direction during the train operation. When changing direction, the vehicle direction is changed by 180 degrees. For example, upon failure of a vehicle, this direction change takes place to replace the disabled vehicle with a normal vehicle of a different train unit.

FIG. 10 is a diagram showing the camera arrangement when a direction change vehicle occurs. In FIG. 10, of the four vehicles shown in FIG. 7, the vehicle 1(3) with vehicle number 3 and the vehicle 1(4) with vehicle number 4 are direction change vehicles. Except this, the configuration in FIG. 10 is the same as that in FIG. 7.

Thus, the cameras located at the positions A1, A2, B1, and B2 of vehicle numbers 3 and 4 are different from those in FIG. 7. For example, the cameras located at the positions A1, A2, B1, and B2 of vehicle number 3 respectively correspond to the camera 34, the camera 33, the camera 32, and the camera 31. Further, the cameras located at the positions A1, A2, B1, and B2 of vehicle number 4 respectively correspond to the camera 44, the camera 43, the camera 42, and the camera 41.

In other words, the current positions of the camera 31, the camera 32, the camera 33, and the camera 34 are respectively denoted by B2, B1, A2, and A1. Further, the current positions of the camera 41, the camera 42, the camera 43, and the camera 44 are respectively denoted by B2, B1, A2, and A1.

On the other hand, the initial positions of the cameras 31 to 34 and the cameras 41 to 44 are as shown in FIG. 9, which will not change due to direction change. As described above, the management device 110 determines the cameras located on the door opening side are the cameras to be used for display, based on the door opening-side information and the initial position information. Thus, as described in FIG. 9, the management device 110 determines the camera 13 and the camera 14, the camera 23 and the camera 24, the camera 33 and the camera 34, and the camera 43 and the camera 44 as the cameras to be used for display.

However, as shown in FIG. 10, the cameras 33 to 34 and the cameras 43 to 44 in the vehicles that have changed direction are located on the A side. Thus, images on the side opposite to the station platform are displayed for the vehicles that have changed direction.

A method of solving this problem includes the steps of knowing in advance whether the train unit includes a vehicle that has changed direction for each train operation, and changing the setting of the vehicle configuration table (more specifically, the correspondence between camera and IP address or other relevant information) stored in the management device 110. However, this requires time and effort to change the setting. Further, it is desirable to avoid changing the setting by humans because a setting work mistake may result in train operation stop.

An object of the present invention is to provide a technique capable of easily displaying images captured in the open door vicinity, even in a train unit including a vehicle that has changed direction.

Solution to Problem

In order to solve the above problem, a typical configuration of a vehicle monitoring system according to the present invention is as follows.

That is, there is provided a vehicle monitoring system that captures and displays the outside of an open door, which is a vehicle door opening upon stopping of a train including a plurality of vehicles in which vehicle doors are provided on both sides (A side and B side) of each vehicle, the vehicle monitoring system including:

a plurality of cameras provided respectively corresponding to a plurality of vehicle doors to capture the outside of each corresponding vehicle door;

a management device that determines the camera corresponding to the open door; and a display device that displays image data taken by the camera corresponding to the open door based on the determination of the management device.

The management device includes a control unit and a storage unit. The storage unit associates and stores the identifier of each of the plurality of cameras and the initial position indicating on which side, A side or B side, each of the plurality of cameras is located.

The control unit obtains door opening-side information indicating that the vehicle door on the B side opens when the train stops as well as open door identification information identifying the open door. After that, the control unit determines a camera, the initial position of which is on the B side, as a display use camera, which is a camera used for display on the display device, with respect to a matching vehicle in which the initial position of the door-open camera, which is the camera corresponding to the open door identified by the open door identification information, and the door opening-side information match with the B side. With respect to a non-matching vehicle in which the initial position of the door-open camera and the door opening-side information do not match with the B side, the control unit determines that a camera, the initial position of which is on the A side, as the display use camera.

Further, a typical configuration of a management device according to the present invention is as follows.

That is, there is provided a management device used for a vehicle monitoring system that captures and displays the outside of an open door, which is a vehicle door opening upon stopping of a train including a plurality of vehicles in which vehicle doors are provided on both sides (A side and B side) of each vehicle.

The management device includes a control unit and a storage unit.

The storage unit associates and stores the identifier of each of a plurality of cameras provided corresponding to each of a plurality of vehicle doors to capture the outside of the corresponding vehicle door, and the initial position indicating on which side, A side or B side, each of the plurality of cameras is located.

The control unit obtains door opening-side information indicating that the vehicle door on the B side opens when the train stops, as well as open door identification information identifying the open door. Then, the control unit determines a camera, the initial position of which is on the B side, as a display use camera which is the camera used for display, with respect to a vehicle in which the initial position of the door-open camera, which is the camera corresponding to the open door identified by the open door identification information, and the door opening-side information match with the B side. With respect to a vehicle in which the initial position of the door-open camera and the door opening-side information do not match with the B side, the control unit determines a camera, the initial position of which is on the A side, as the display use camera.

Further, a typical configuration of a monitoring method according to the present invention is as follows.

That is, there is provided a monitoring method in a vehicle monitoring system that captures and displays the outside of an open door, which is a vehicle door opening upon stopping of a train including a plurality of vehicles in which vehicle doors are provided on both sides (A side and B side) of each vehicle.

The monitoring method includes:

a storing step for associating and storing the identifier of each of a plurality of cameras provided corresponding to each of a plurality of vehicle doors to capture the outside of the corresponding vehicle door, and the initial position indicating on which side, A side or B side, each of the plurality of cameras is located;

an information obtaining step for obtaining door opening-side information indicating that the vehicle door on the B side opens when the train stops as well as open door identification information identifying the open door;

a determination step for determining a camera, the initial position of which is on the B side, as a display use camera which is the camera used for display, with respect to a vehicle in which the initial position of the door-open camera, which is the camera corresponding to the open door identified by the open door identification information and the open door side information match with the B side, while with respect to a vehicle in which the initial position of the door-open camera and the door opening-side information do not match with the B side, determining a camera, the initial position of which is on the A side as the display use camera; and a display step for displaying image data captured by the camera determined as the display use camera in the determination step.

Advantageous Effects of Invention

According to the above configuration, it is possible to easily display images captured in the open door vicinity even in a train including a vehicle that has changed direction.

BRIEF DESCRIPTION OF DRAWINGS

FIG. 1 is a diagram showing the configuration of a vehicle monitoring system according to an embodiment of the present invention.

FIG. 5 is a diagram showing a use camera determination method according to an embodiment of the present invention.

FIG. 8 is a diagram showing the IP address of each device according to the background art.

FIG. 9 is a diagram showing a use camera determination method according to the background art.

FIG. 10 is a diagram showing the camera arrangement when a change in vehicle direction occurs in the background art.

Figure 2A:
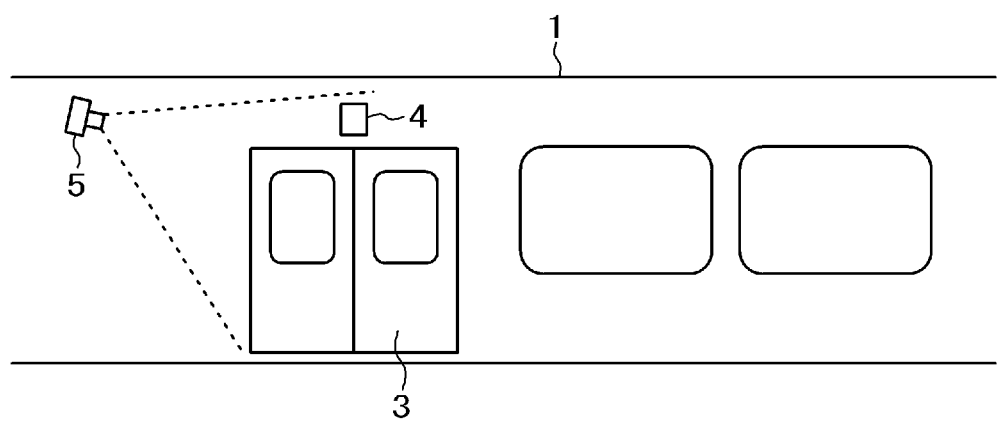
FIG. 2A is a diagram showing turn-off determination of a vehicle side lamp by using a camera according to an embodiment of the present invention.

DESCRIPTION OF EMBODIMENTS (Embodiment of the Present Invention)

An embodiment of the present invention will be described.

FIG. 1 is a diagram showing the configuration of a vehicle monitoring system according to an embodiment of the present invention, which is a top view. Of the configurations in FIG. 1, the same configurations as those in FIG. 7 of the background art are denoted by the same reference numerals and their description is omitted. Of the configurations in FIG. 1, a management device 10 and a vehicle side lamp 4 are different from those in FIG. 7. Further, of four vehicles 1(1) to 1(4), two vehicles 1(3) and 1(4) are vehicles that changed has direction in FIG. 1, similarly to FIG. 10 of the background art.

Figure 7:
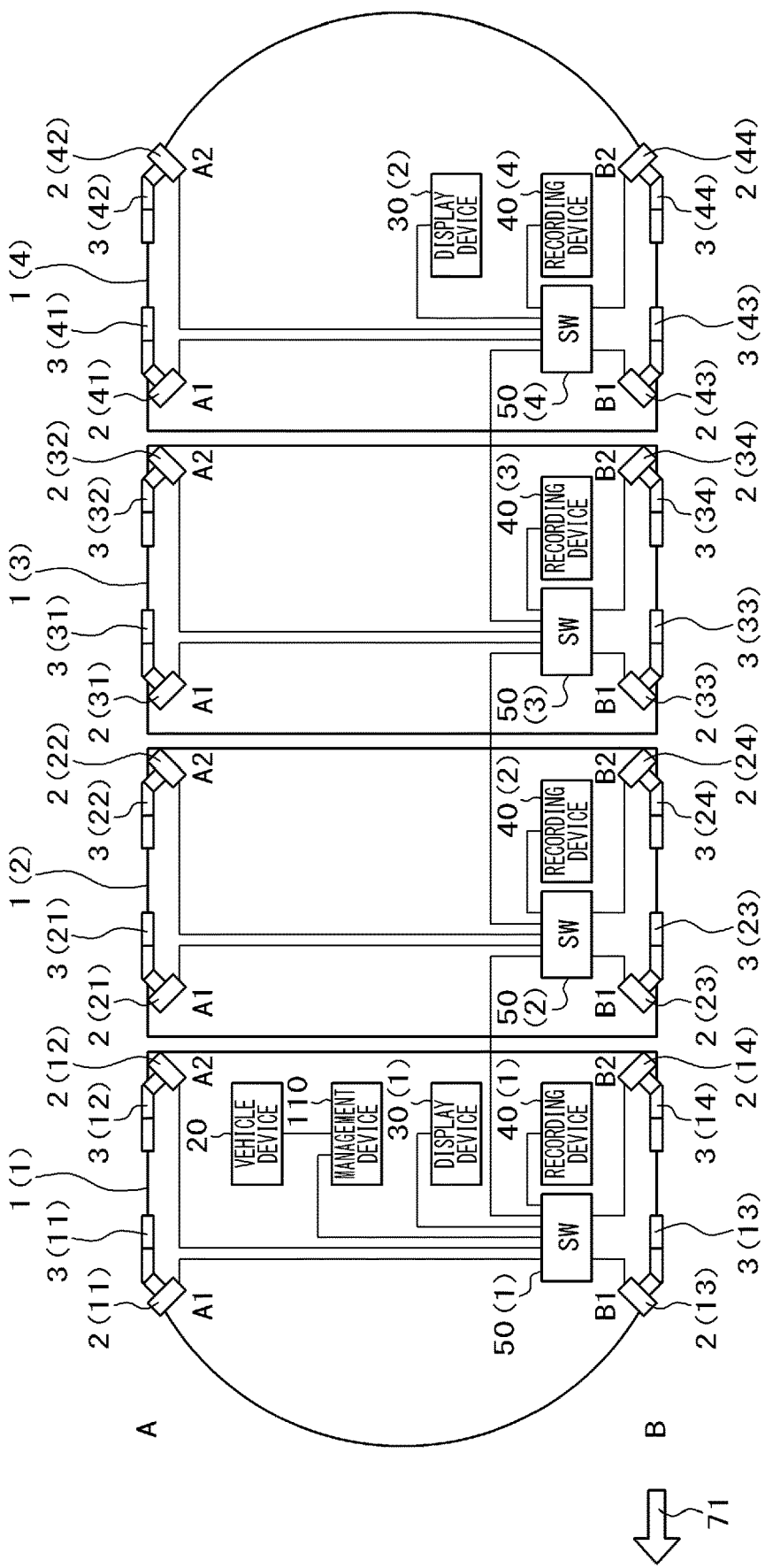
FIG. 7 is a diagram showing the configuration of a vehicle monitoring system according to the background art.

In addition to the management device 10 and the vehicle side lamp 4, cameras 2(11) to 2(44), a vehicle device 20, a display devices 30(1) to 30(2), recording devices 40(1) to 40(4), and network switches 50(1) to 50(4) are mounted on the train shown in FIG. 1, similarly to FIG. 7.

Further, in the example of FIG. 1, the vehicle side lamps 4 indicating that the vehicle door is open or closed are provided one by one on both sides (A side and B side) of each vehicle. More specifically, vehicle side lamps 4(11), 4(13), 4(21), 4(23), 4(31), 4(33), 4(41), and 4(43) are provided respectively corresponding to vehicle doors 3(11), 3(13), 3(21), 3(23), 3(31), 3(33), 3(41), and 3(43). These vehicle side lamps are collectively referred to as vehicle side lamp(s) 4.

The vehicle side lamp 4 is turned on when the corresponding vehicle door 3 is open, and is turned off when the corresponding vehicle door 3 is closed. The on and off of the vehicle side lamp 4 depends on the open/close state of the vehicle door 3, regardless of the vehicle monitoring system of the present embodiment. For example, by using a known distance sensor or other device, the vehicle side lamp 4 is turned on when detecting the open state of the vehicle door 3 and is turned off when detecting the closed state.

Note that in the example of FIG. 1, the vehicle side lamps 4 are arranged one by one on both sides (A side and B side) of each vehicle, but may also be arranged so as to correspond one-to-one to each vehicle door 3. In other words, the vehicle side lamps 4(11) to 4(44) may also be arranged so as to correspond one-to-one to the vehicle doors 3(11) to 3(44).

Each of the cameras 2(11) to 2(44) is provided corresponding to each of the vehicle doors 3 to capture the outside of each corresponding vehicle door 3. More specifically, the cameras 2(11) to 2(44) are placed on the outside of the vehicle 1, respectively, in the vicinity of the vehicle doors 3(11) to 3(44) so as to be able to capture the vehicle outside such as the station platform near the vehicle doors. Note that the camera 2 can be placed anywhere, as long as it can capture the outside of the vehicle 1, and may be embedded into the outside wall of the vehicle 1.

The vehicle monitoring system according to the present embodiment is configured to include the vehicle side lamp 4, the management device 10, the vehicle device 20, and the display device 30. In addition, the vehicle monitoring system can also be configured to include the recording device 40 and the network switch 50.

In the present embodiment, the vehicle monitoring system is designed to detect the ON state of the vehicle side lamp 4, namely, the open-state of the vehicle door 3, and display image data captured by the camera 2 corresponding to the vehicle door 3 in the open state, on the display device 30. In this way, even in a train unit including a vehicle that has changed direction, it is possible to reliably display images captured in the open door vicinity.

Figure 2B:
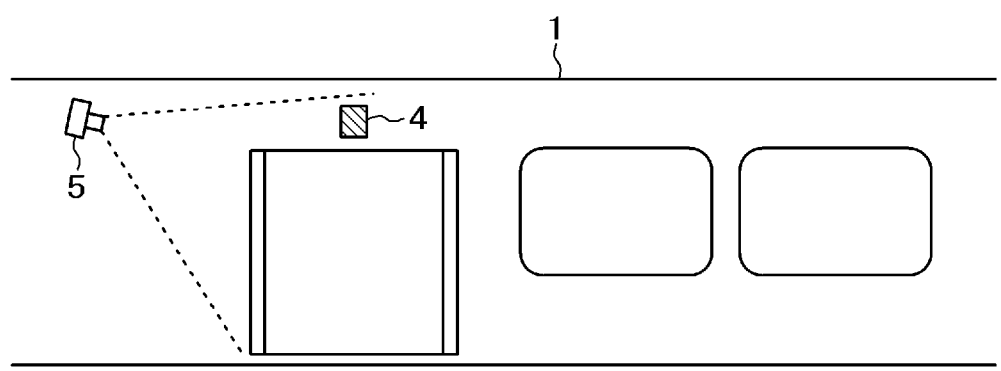
FIG. 2B is a diagram showing the turn-off determination of the vehicle side lamp by using the camera according to an embodiment of the present invention.

FIG. 2A is a diagram showing the turn-off determination of the vehicle side lamp by using the camera according to an embodiment of the present invention. FIG. 2B is a diagram showing the turn-on determination of the vehicle side lamp by using the camera according to an embodiment of the present invention. FIG. 2A and FIG. 2B are views of the vehicle 1 seen from the outside of the vehicle 1 in the horizontal direction. The dashed lines in FIG. 2A and FIG. 2B represent the view angle of the camera.

In the examples of FIG. 2A and FIG. 2B, the vehicle side lamp 4 is placed on the outside wall of the vehicle 1 above the vehicle door 3. Then, the vehicle side lamp 4 is turned off when the vehicle door 3 is closed and turned on when the vehicle door 3 is open. The camera 5 captures the vehicle side lamp 4 and transmits the captured image to the management device 10. The management device 10 analyzes the image received from the camera 5, and determines the ON and OFF state of each vehicle side lamp 4. In other words, the management device 10 determines whether each vehicle door 3 is open or closed.

As described above, in the present embodiment, the management device 10 obtains open door identification information (ON information or OFF information of the vehicle side lamp 4) that identifies the open door, which is the vehicle door opening, from the respective vehicle doors of each vehicle.

Although the camera 5 may be provided separately from the camera 2 in FIG. 1, the present embodiment uses some of the cameras 2 in FIG. 1. In other words, the camera 2 corresponding to the door 3 with the vehicle side lamp 4 is used as the camera 5. The use of the camera 2 in FIG. 1 as the camera 5 eliminates the need to provide a new camera, so that the cost of the vehicle monitoring system can be reduced.

More specifically, the cameras 2(11), 2(13), 2(23), 2(31), 2(33), 2(41), and 2(43) respectively corresponding to the vehicle doors 3(11), 3(13), 3(21), 3(23), 3(31), 3(33), 3(41), and 3(43), which respectively correspond to the vehicle side lamps 4(11), 4(13), 4(21), 4(23), 4(31), 4(33), 4(41), and 4(43), are used as the cameras 5 for capturing the state of the vehicle side lamps 4(11), 4(13), 4(21), 4(23), 4(31), 4(33), 4(41), and 4(43), respectively.

Note that the process in the management device 10 to analyze the image received from the camera 5 and determine the ON and OFF states of each vehicle side lamp can be achieved by a known image processing technology. For example, of the image data received from the camera 5, the management device 10 previously measures the brightness level at the position of the vehicle side lamp 4 when turned on and off, and then sets the intermediate brightness level between its turn-on and off times. Then, when the vehicle side lamp 4 is actually captured and the brightness level at the position of the vehicle side lamp 4 is equal to or more than the threshold, the management device 10 determines the ON state. When the brightness level is less than the threshold, the management device 10 determines the OFF state.

Or, the management device 10 causes a predetermined blinking pattern to occur from the vehicle side lamp 4 in the ON state. This blinking pattern has a frequency invisible to humans. The management device 10 determines the ON state by detecting this blinking pattern.

Note that in the present embodiment, the management device 10 is configured to determine whether the vehicle door 3 is open or closed by determining the ON and OFF states of the vehicle side lamp 4. However, the management device 10 can also be configured to determine whether the vehicle door 3 is open or closed by using other methods. For example, a known distance sensor for measuring the distance between doors, which are doors opening, may be placed in the vicinity of the vehicle door 3, to determine whether the vehicle door 3 is open or closed by using the distance sensor.

The vehicle device 20 controls train movement and stopping, opening and closing of the vehicle door 3, or other operations based on instructions from the driver. The vehicle device 20 notifies the management device 10 of train movement start information, train stop information, and train traveling direction information (for example, first vehicle information). Further, the vehicle device 20 also notifies the management device 10 of which door, either on the A side and the B side, opens when the train stops, as door opening-side information.

Note that in FIG. 7, it is assumed that the right side is A side and the left side is B side seen from the train traveling direction. However, in the present embodiment, as described in FIG. 7, the right side can also be considered as A side and the left side as B side, or conversely, the right side can be considered as B side and the left side as A side. In the example of FIG. 1, similarly to FIG. 7, the right side is defined as A side and the left side is defined as B side when seen from the train traveling direction.

The management device 10 previously stores the IP addresses of the camera 2 and the display device 30 for one train unit (the vehicles with vehicle numbers 1 to 4 in the present embodiment) into a database (a management device storage unit 12 described below). When receiving train movement start information and train stop information from the vehicle device 20, the management device 10 notifies the display device 30 of the received train movement start information and train stop information.

When the train stops at the station platform and the vehicle door 3 is opened, namely, upon reception of the train stop information from the management device 10, the display device 30 selects the camera 2 on the side on which the vehicle door 3 is opened by referring to the management device storage unit 12 and displays the image captured by the selected camera 2.

Figure 3:
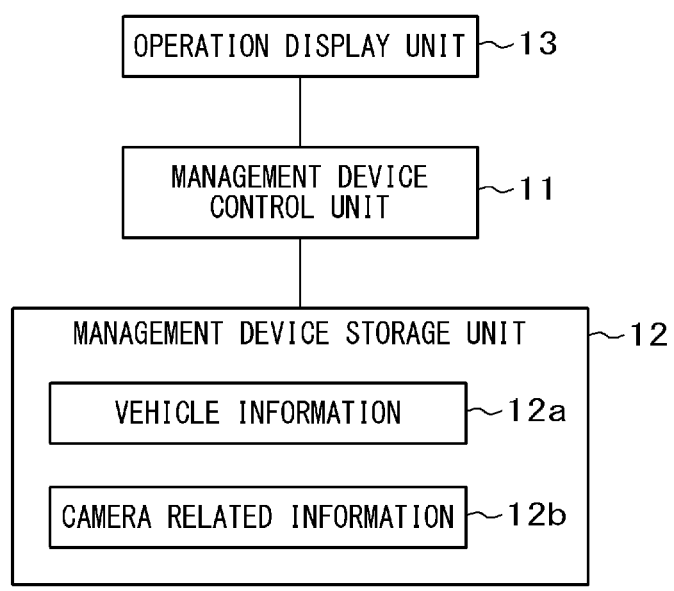
FIG. 3 is a diagram showing the configuration of a management device according to an embodiment of the present invention.

FIG. 3 is a diagram showing the configuration of the management device according to an embodiment of the present invention. As shown in FIG. 3, the management device 10 is configured to include a management device control unit 11, a management device storage unit 12, and an operation display unit 13.

The operation display unit 13 is configured to include an operation unit that receives instructions from the operator, and a display unit that displays various types of information. The operation unit is, for example, configured with a keyboard, a mouse, and the like. The display unit is, for example, configured with an LCD (liquid Crystal Display) or the like.

The management device storage unit 12 will be described with reference to FIG. 5. FIG. 5 shows the contents of the management device storage unit 12. The management device storage unit stores data including vehicle information 12a and camera-related information 12b.

The vehicle information 12a is the information obtained from the vehicle device 20, which includes first vehicle information and door opening-side information. The first vehicle information is information indicating the first vehicle of the train, namely, information indicating the traveling direction of the train. The door opening-side information is information indicating the side on which the vehicle door opens when the train stops at the station platform.

Note that the management device storage unit 12 should not necessarily be physically located within the management device 10. The management device storage unit 12 can be located outside the management device 10 if the management device storage unit 12 is accessible from the management device control unit 11. For example, a unique IP address is assigned to the management device storage unit 12 so that the management device storage unit 12 can be accessed from the management device control unit 11 through the SW 50.

At least an identifier (61 in FIG. 5) that identifies each camera 2 mounted on the train of the vehicle monitoring system, an IP address (62 in FIG. 5) which is the communication address of each camera 2, initial position information (63 in FIG. 5) of each camera 2, and position information (67 in FIG. 5) of the use camera to be used for display are associated and stored in the camera related information 12b.

In the example of FIG. 5, the identifier that identifies each camera 2 is device name (61 in FIG. 5), such as camera 11 to camera 14. The initial position information (63 in FIG. 5) of each camera 2 indicates on which side, A side or B side, each camera 2 is located in the initial train configuration. More specifically, the initial position indicates at which door position each camera 2 is located in the train configuration. The IP addresses of the respective cameras are set to values different from each other.

The device name (61 in FIG. 5), the IP address (62 in FIG. 5), and the initial position information (63 in FIG. 5) are input and stored, for example, by the operator through the operation unit.

In the example of FIG. 5, the initial position information is denoted by A1, A2, B1, and B2 in each vehicle. In this way, the initial position not only indicates on which side, A side or B side, each camera is located in the train configuration, but also includes the order of the position of each camera from the top of the train on the A side and on the B side. For example, in the example of FIG. 5, the initial positions of the camera 11 and the camera 12 are the first and the second, respectively, from the top of the train on the A side of the vehicle with vehicle number 1. Further, the initial positions of the camera 13 and the camera 14 are the first and the second, respectively, from the top of the train on the B side of the vehicle with vehicle number 1.

The use camera position information (67 in FIG. 5) indicates the camera 2 that the management device control unit 11 determined to use for display on the display device 30, as well as the position of the camera 2. In the example of FIG. 5, for example, with respect to the vehicle with vehicle number 1, the use camera position information indicates that the camera 13 and the camera 14 are used for display, and also indicates that the positions of the camera 13 and the camera 14 are B1 and B2.

Vehicle side lamp information (65 in FIG. 5) indicates the state (on or off) of the vehicle side lamp 4 that the management device control unit 11 obtained using the camera 5 described above.

Current position information (64 in FIG. 5) is information of the current position indicating at which door position each camera 2 is currently located. The current position information is provided for the convenience of description and is not stored in the management device storage unit 12.

Logical position information (66 in FIG. 5) is information that the management device control unit 11 logically derived and obtained based on the door opening-side information and the door side lamp information. The logical position information indicates the position (logical position) of each camera 2. The management device control unit 11 recognizes the current position of the camera 2 by obtaining the logical position of the camera 2. Of course, the logical position has the same content as the current position.

Note that, in addition to the device name (61 in FIG. 5), the IP address (62 in FIG. 5), the initial position information (63 in FIG. 5), and the use camera position information (67 in FIG. 5), the vehicle side lamp information (65 in FIG. 5) and the logical position information (66 in FIG. 5) can also be stored in the management device storage unit 12 as the camera related information 12b.

The management device control unit 11 controls each unit configuring the management device 10 in which the management device control unit 11 is included. Further, the management device control unit 11 obtains the first vehicle information and the door opening-side information from the vehicle device 20, and stores the obtained information in the management device storage unit 12 as the vehicle information 12a (first vehicle information and door opening-side information).

Further, based on the image data of the camera 2 captured the vehicle side lamp 4, the management device control unit 11 determines whether the particular vehicle side lamp 4 is turned on or off. In this way, the management device control unit 11 obtains the vehicle side lamp information (65 in FIG. 5) that identifies the open vehicle door, namely, the open door identification information.

Further, based on the initial position of the camera corresponding to the vehicle side lamp 4 turned on in a certain vehicle and on the initial position of the camera 13 corresponding to the vehicle side lamp 4 turned on in the vehicle number 1 which is the first vehicle, the management device control unit 11 determines whether the vehicle has changed direction.

Alternatively, based on the initial position of the camera corresponding to the vehicle side lamp 4 turned on in a certain vehicle and on the door opening-side information, the management device control unit 11 determines whether the vehicle has changed direction.

Further, with respect to a vehicle that has not changed direction, the management device control unit 11 defines the initial position corresponding to the vehicle number of the vehicle, directly as the logical position. Further, with respect to vehicles having changed direction, the management device control unit 11 defines B side for the logical position for a vehicle whose initial position is A side, and defines A side for the logical position for a vehicle whose initial position is B side.

Further, the management device control unit 11 determines a camera whose logical position is located on the same side as the door opening-side information (B in the example of FIG. 5) of the vehicle information 12a, as the camera to be used for display. Then, the management device control unit 11 stores the use camera position, which is the position of the camera determined to be used for display, into the management device storage unit 12 as the use camera position information (67 in FIG. 5).

In this way, the management device control unit 11 obtains the door opening-side information (B side) indicating that the vehicle door on the B side opens when the train stops, from the train. In addition, the management device control unit 11 also obtains open door identification information (vehicle side lamp information) that identifies the open door when the train stops, from each of the respective vehicles. Then, with respect to a vehicle in which the initial position of the door-open camera, which is the camera corresponding to the open door identified by the open door identification information, and the door opening-side information match with the B side, the management device control unit 11 determines a camera, the initial position of which is on the B side, as the display use camera to be used for display. With respect to a vehicle in which the initial position of the door-open camera and the door opening-side information do not match with the B side, the management device control unit 11 determines a camera, the initial position of which is on the A side, as the display use camera.

Figure 4:
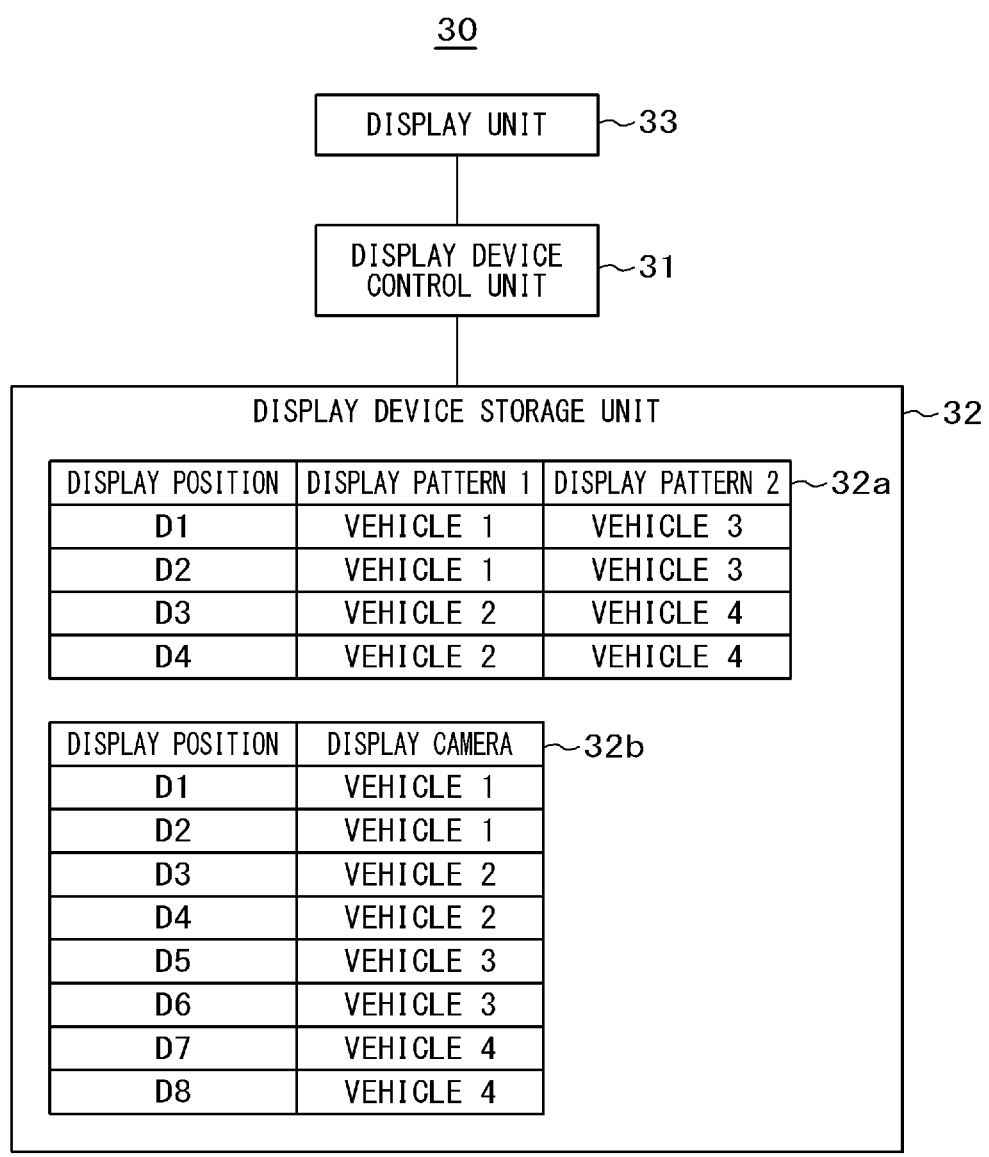
FIG. 4 is a diagram showing the configuration of a display device according to an embodiment of the present invention.

FIG. 4 is a diagram showing the configuration of the display device according to an embodiment of the present invention. As shown in FIG. 4, the display device 30 is configured to include a display device control unit 31, a display device storage unit 32, and a display unit 33.

The display unit 33 displays image data captured by the camera 2 and is, for example, configured with an LCD (Liquid Crystal Display) or the like.

The display device storage unit 32 stores the correspondence between the display screen and the camera 2 in the display device 30, as a display screen/camera correspondence table. Reference numeral 32a in FIG. 4 denotes a correspondence table when a display pattern 1 and a display pattern 2 are alternately and repeatedly displayed on display screens D1 to D4. In the display pattern 1, the image of the camera 2 of the vehicle with vehicle number 1 is displayed on the display screens D1 and D2, and the image of the camera 2 of the vehicle with vehicle number 2 is displayed on the display screens D3 and D4. Further, in the display pattern 2, the image of the camera 2 of the vehicle with vehicle number 3 is displayed on the display screens D1 and D2, and the image of the camera 2 of the vehicle with vehicle number 4 is displayed on the display screen D3 and D4.

Figure 6:
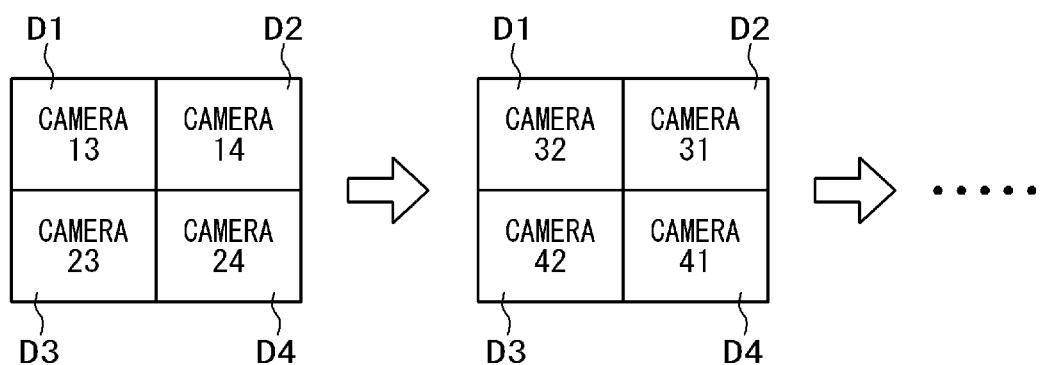
FIG. 6 is a diagram showing a display method in the display device according to an embodiment of the present invention.

The state of the display in the case of 32a in FIG. 4 is shown in FIG. 6. FIG. 6 is a diagram showing the display method of the display device according to an embodiment of the present invention. As shown in FIG. 6, the display pattern 1 and the display pattern 2 are repeatedly switched and displayed on the four display screens D1 to D4. In the present embodiment, as shown in FIG. 6, the images of the camera 13, the camera 14, the camera 23, and the camera 24 are respectively displayed on the display screens D1 to D4 in the display pattern 1. In the display pattern 2, the images of the camera 32, the camera 31, the camera 42, and the camera 41 are respectively displayed on the display screens D1 to D4.

At this time, the use camera position (67 in FIG. 5) of the camera 13 is vehicle 1-B1 and the use camera position of the camera 14 is vehicle 1-B2. Thus, in the traveling direction of the train, the camera 13 located at B1, which is closer to the top, is displayed on the display screen D1, and the camera 14 located at B2, which is backward, is displayed on the display screen D2.

In this way, even of the cameras in the same vehicle, the image of a camera located closer to the top in the train traveling direction is displayed on the right side of the display screen, thus facilitating monitoring.

Further, reference numeral 32b in FIG. 4 denotes the table in which the display screens D1 and D2, D3 and D4, D5 and D6, and D7 and D8 are respectively associated with the image of the camera of the vehicle with vehicle number 1, the image of the camera of the vehicle with vehicle number 2, the image of the camera of the vehicle with vehicle number 3, and the image of the camera of the vehicle with vehicle number 4. In this case, one display pattern is continuously displayed on eight display screens D1 to D8. In this way, for example, the images of the camera 13, the camera 14, the camera 23, the camera 24, the camera 32, the camera 31, the camera 42, and the camera 41 are continuously displayed, respectively, on the display screens D1 to D8.

Note that it is possible to use four display panels as the display screens D1 to D4. Alternatively, it is possible to divide the screen into four sections in one display panel. This also applies to the display screens D1 to D8.

The display device control unit 31 controls each unit configuring the display device 30 in which the display device control unit 31 is included. Further, the display device control unit 31 allows the display unit 33 to display the image data captured by the camera corresponding to the open door, based on the determination of the management device 10 with respect to the camera corresponding to the open door.

In other words, upon receiving the train stop information from the management device 10, the display device control unit 31 obtains the use camera position (67 in FIG. 5) which is the position of the camera used for display in each vehicle (namely, the camera corresponding to the open door), as well as the IP address (62 in FIG. 5) of the camera of the particular use camera position, by referring to the camera related information 12b of the management device storage unit 12. Then, the display device control unit 31 obtains image data from the camera of the obtained IP address, and displays the obtained image data based on the obtained use camera position and on the display position/camera correspondence table stored in the display device storage unit 32.

For example, the management device control unit 11 and the display device control unit 31 can be respectively configured with CPUs (Central Processing Unit) and internal memories for storing their operation programs and the like. Each CPU operates according to each operation program.

For example, the management device storage unit 12 and the display device storage unit 32 are respectively configured with semiconductor memories (flash memory, RAM (Random Access Memory), ROM (read only memory), and the like) and magnetic disks, and the like.

Next, the method for determining the camera 2 used for display on the display device 30 will be described with reference to FIG. 5. FIG. 5 is a diagram showing the use camera determination method according to an embodiment of the present invention.

As described above, the initial position information (63 in FIG. 5) is previously set in the management device 10. In the example of FIG. 5, the initial positions of the cameras 11 to 14, the cameras 21 to 24, the cameras 31 to 34, and the cameras 41 to 44 are A1, A2, B1, and B2, respectively.

Further, in the example of FIG. 5, the current position (64 in FIG. 5) of each camera 2 of vehicle number 1 and vehicle number 2 is the same as the initial position. However, the current position of each camera 2 of vehicle number 3 and vehicle number 4 is different from the initial position. This is because two vehicles with vehicle number 3 and vehicle number 4 have changed direction.

First, the management device control unit 11 receives vehicle information from the vehicle device 20 and stores the received vehicle information in the management device storage unit 12. The stored vehicle information (12a in FIG. 5) includes the first vehicle information (namely, train traveling direction information) and the door opening-side information. In the example of FIG. 5, the first vehicle is the vehicle with vehicle number 1 (vehicle 1(1) in FIG. 1), and the door opening side is the B side in FIG. 1.

Further, when the train stops at the station platform, the management device control unit 11 obtains vehicle side lamp information (65 in FIG. 5) indicating the state (on or off) of the vehicle side lamp 4. The vehicle side lamp information is the information (open door identifying information) that identifies the vehicle door actually opening. The value in the ON state (open state) is 1, while the value in the off state (closed state) is 0. Further, the value for the case where there is no corresponding vehicle side lamp 4 is also 0.

As described above, in the present embodiment, the camera 11, the camera 13, the camera 21, the camera 23, the camera 31, the camera 33, the camera 41, and the camera 43 are respectively used as cameras to capture the state of the vehicle side lamps 4(11), 4(13), 4(21), 4(23), 4(31), 4(33), 4(41), and 4(44).

In the example of FIG. 5, the vehicle side lamp information (65 in FIG. 5) indicates that the vehicle side lamps 4(13), 4(23), 4(31), and 4(41), which respectively correspond to the camera 13, the camera 23, the camera 31, and the camera 41, are turned on, and that other vehicle side lamps 4 are turned off or not present.

The management device control unit 11 obtains the logical position information (66 in FIG. 5) indicating the position (logical position) of each camera 2 based on the door opening-side information and the vehicle side lamp information. In the example of FIG. 5, for example, the logical positions of the cameras 11 to 14 of vehicle number 1 are respectively A1, A2, B1, and B2. Further, the logical positions of the cameras 31 to 34 of vehicle number 3 are respectively B2, B1, A2, and A1. The determination method of logical position will be described below.

The management device control unit 11 determines the camera placed on the door opening side (B side in the example of FIG. 5) as the camera to be used for display, based on the door opening-side information and the logical position information. Then, the management device control unit 11 stores the use camera position information (67 in FIG. 5), which is the use camera determination result, into the management device storage unit 12.

In the example of FIG. 5, the management device control unit 11 determines the cameras 13 and 14, the cameras 23 and 24, the cameras 31 and 32, and the cameras 41 and 42 as the cameras to be used for display. Then, the management device control unit 11 associates the vehicle 1-B1 and the vehicle 1-B2 with the camera 13 and the camera 14, respectively, and stores them as use camera position information into the management device storage unit 12. Similarly, the management device control unit 11 associates the vehicle 2-B1 and the vehicle 2-B2 with the camera 23 and the camera 24, respectively, and stores them in the management device storage unit 12. The management device control unit 11 associates the vehicle 3-B1 and the vehicle 3-B2 with the camera 32 and the camera 31, respectively, and stores them in the management device storage unit 12. Then, the management device control unit 11 associates the vehicle 4-B1 and the vehicle 4-B2 with the camera 42 and the camera 41, respectively, and stores them in the management device storage unit 12.

Next, Examples 1 to 3 will be described with respect to the determination method of logical position by the management device control unit 11.

EXAMPLE 1

In Example 1, the management device control unit 11 determines the logical position by using the first vehicle information and the door opening-side information within the vehicle information 12a obtained from the vehicle device 20. In Example 1, the first vehicle is the vehicle with vehicle number 1 that has not changed direction.

First, the management device control unit 11 checks the vehicle number of the first vehicle in the vehicle information 12a. In Example 1, the first vehicle in the vehicle information 12a is the vehicle with vehicle number 1. The first vehicle basically has an asymmetric shape and does not change direction in the formation. For this reason, the management device control unit 11 determines the use camera position based on the door opening-side information and the initial position information, without determining the logical positions of the cameras 11 to 14 of the first vehicle.

Note that, as described below in Example 3, with respect to the vehicle with vehicle number 1, it is also possible that because of the fact that the door opening side (B side in the example of FIG. 5) indicated by the door opening-side information in the vehicle information 12a and the initial position B1 of the camera 2 corresponding to the vehicle side lamp 4 turned on (namely, the camera 2 corresponding to the vehicle door 3 opening) match with the B side, the management device control unit 11 determines that the vehicle with vehicle number 1 has not changed direction. In the example of FIG. 5, in the vehicle number 1, the vehicle side lamp 4 corresponding to the camera 13 is turned on. The initial position of the camera 13 is B1. Thus, the initial position B1 of the camera 13 corresponding to the vehicle side lamp 4 turned on matches the door opening-side information B with the B side.

Next, the management device control unit 11 determines whether the initial position of a camera corresponding to the vehicle side lamp 4 turned on (namely, a camera corresponding to an open door which is in an open state) in the vehicle number 2 and each subsequent vehicle, and the initial position of the camera 13 corresponding to the vehicle side lamp 4 turned on (namely, the door opening-side information) in the vehicle number 1, which is the first vehicle, match with the A side or the B side. Matching means that the vehicle is headed in the same direction as the first vehicle and has not changed direction. Not matching means that the vehicle has changed direction.

In this way, in Example 1, the management device control unit 11 determines whether the initial position of the camera corresponding to the vehicle side lamp 4 turned on in the vehicle number 2 and each subsequent vehicle, and the initial position of the camera 13 corresponding to the vehicle side lamp 4 turned on in the vehicle number 1 match with the A side or with the B side. Incidentally, in Example 1, as described above, B indicated by the initial position of the camera 13 corresponding to the vehicle side lamp 4 turned on in the vehicle number 1 matches B of the door opening-side information. Further, the initial position of the camera corresponding to the vehicle side lamp 4 turned on means the initial position of the camera corresponding to the open door. Thus, in Example 1, in each of the vehicles with vehicle number 2 and subsequent numbers, the management device control unit 11 determines whether the initial position of the camera corresponding to the open door and the door opening-side information match with the A side or with the B side.

In the example of FIG. 5, the vehicle side lamp 4 corresponding to the camera 23 is turned on in the vehicle number 2. The initial position of the camera 23 is B1 and matches B1, which is the initial position of the camera 13 of the vehicle number 1, with the B side. Thus, the vehicle with vehicle number 2 has not changed direction.

Further, in the vehicle number 3, the vehicle side lamp 4 corresponding to the camera 31 is turned on. The initial position of the camera 31 is A1 and does not match B1, which is the initial position of the camera 13 of the vehicle number 1, with the A side. Thus, the vehicle with vehicle number 3 has changed direction.

Further, the vehicle side lamp 4 corresponding to the camera 41 is turned on in the vehicle number 4. The initial position of the camera 41 is A1 and does not match B1, which is the initial position of the camera 13 of the vehicle number 1, with the A side. Thus, the vehicle with vehicle number 4 has changed direction.

Next, the management device control unit 11 generates logical position information (66 in FIG. 5) based on the initial position information (63 in FIG. 5) stored in the management device storage unit 12. More specifically, with respect to a vehicle that has not changed direction, the management device control unit 11 defines the initial position corresponding to the vehicle number of the vehicle directly as the logical position. Further, with respect to vehicles having changed direction, the management device control unit 11 defines Bn to B1 as the logical position for a vehicle whose initial position is A1 to An, and An to A1 as the logical position for a vehicle whose initial position is B1 to Bn. Here, n is an integer of 2 or more. In other words, with respect to the vehicle having changed direction, the management device control unit 11 changes its initial position between the A and B sides, while defining the order opposite to the order of the initial position as the order of the logical position.

In the example of FIG. 5, the logical positions corresponding to the cameras 11 to 14 in the vehicle number 1 are respectively A1, A2, B1, and B2. Also, the logical positions corresponding to the cameras 21 to 24 in the vehicle number 2 are respectively A1, A2, B1, and B2. Further, the logical positions corresponding to the cameras 31 to 34 in the vehicle number 3 are respectively B2, B1, A2, and A1. Further, the logical positions corresponding to the cameras 41 to 44 are respectively B2, B1, A2, and A1.

Then, the management device control unit 11 stores the logical position corresponding to each camera into the management device storage unit 12. At the same time, the management device control unit 11 determines the camera 2, the logical position of which is located on the same side (B side) as the door opening side (B side in the example of FIG. 5) of the vehicle information 12a, as the camera to be used for display.

In this way, with respect to a vehicle in which the initial position of the camera corresponding to the open door and the door opening-side information match with the B side, the management device control unit 11 determines a camera, the initial position of which is on the B side, as the camera to be used for display, because the vehicle has not changed direction. With respect to a vehicle in which the initial position of the camera corresponding to the open door and the door opening-side information do not match with the B side, the management device control unit 11 determines a camera, the initial position of which is on the A side, as the camera to be used for display, because the vehicle has changed direction.

In the example of FIG. 5, the management device control unit 11 determines the cameras 13 and 14 as the cameras to be used for display for the vehicle number 1, the cameras 23 and 24 as the cameras to be used for display for the vehicle number 2, the cameras 32 and 31 as the cameras to be used for display for the vehicle number 3, and the cameras 42 and 41 as the cameras to be used for display for the vehicle number 4.

Further, the management device control unit 11 associates a flag indicating display use into the management device storage unit 12 by associating the flag with the camera determined to be used for display. Preferably, the management device control unit 11 stores the use camera position, which is the position of the camera determined to be used for display, into the management device storage unit 12. More specifically, with respect to a vehicle that has not changed direction, the management device control unit 11 defines the order of the initial position directly as the order of the use camera position. With respect to a vehicle having changed direction, the management device control unit 11 defines the order opposite to the order of the initial position, as the order of the use camera position. The order of initial positions represents the order of positions from the top of the train on the A side and on the B side (A1, A2, and so on in the vehicle number 1, B1, B2 and so on in the vehicle number 1).

In the example of FIG. 5, the management device control unit 11 stores the vehicle 1-B1 and the vehicle 1-B2 into the management device storage unit 12, as the use camera position (67 in FIG. 5), by associating them with the camera 13 and the camera 14, respectively, which are determined to be used for display in the vehicle number 1 that has not changed direction. The order of the initial positions of the camera 13 and the camera 14 are respectively B1 and B2 of vehicle number 1. The management device control unit 11 defines this order as the order of the use camera position.

Further, the management device control unit 11 stores the vehicle 2-B1 and the vehicle 2-B2 into the management device storage unit 12, as the use camera position, by associating them with the camera 23 and the camera 24, respectively, in the vehicle number 2 that has not changed direction. The order of the initial positions of the camera 23 and the camera 24 are respectively B1 and B2 of vehicle number 2. The management device control unit 11 defines this order as the order of the use camera position.

Further, the management device control unit 11 stores the vehicle 3-B2 and the vehicle 3-B1 into the management device storage unit 12, as the use camera position, by associating them with the camera 31 and the camera 32, respectively, in the vehicle number 3 having changed direction. The order of the initial positions of the camera 31 and the camera 32 are respectively A1 and A2 of vehicle number 3. The order opposite to this order is defined as the order of the use camera position.

Further, the management device control unit 11 stores the vehicle 4-B2 and the vehicle 4-B1 into the management device storage unit 12, as the use camera position, by associating them with the camera 41 and the camera 42, respectively, in the vehicle number 4 having changed direction. The order of the initial positions of the camera 41 and the camera 42 are respectively A1 and A2 of vehicle number 4. The order opposite to this order is defined as the order of the use camera position.

As described above, the management device control unit 11 obtains the current position (64 in FIG. 5) of each camera based on the door opening-side information and the open door identification information (vehicle side lamp information). Then, the management device control unit 11 associates the obtained current position with the identifier (61 in FIG. 5) of each camera, as the logical position (66 in FIG. 5), into the management device storage unit 12. Thus, by using the logical position (namely, the stored current position), the process of the management device control unit 11 can be simplified when the train stops next.

For example, when the train stops next, the management device control unit 11 refers to the logical position information (66 in FIG. 5) of the management device storage unit 12. At this time, when the door opening-side information is B side, the management device control unit 11 determines a camera, the logical position of which is on the B side, as a display use camera. Further, when the door opening-side information at this time is A side, the management device control unit 11 determines a camera, the logical position of which is on the A side, as a display use camera. In this case, the logical position can only represent either the A side or the B side, and the order on the A side or the B side is not necessarily required.

Further, the management device control unit 11 obtains the current position (64 in FIG. 5) of each camera based on the door opening-side information and the open door identification information. Then, of the obtained current position information, the management device control unit 11 associates the information of the B side, which is the same as the door opening-side information, with the identifier (61 in FIG. 5) of each camera, and stores the information in the management device storage unit 12 as the use camera position (67 in FIG. 5). In other words, also the use camera position (67 in FIG. 5) includes the information of the current position.

The display device 30 refers to the management device storage unit 12 to obtain the use camera position (67 in FIG. 5) which is the position of the camera to be used for display in each vehicle, as well as the IP address (62 in FIG. 5) corresponding to the camera. Then, the display device 30 obtains image data from the camera of the obtained IP address, and displays the obtained image data according to the obtained camera position.

In this way, when the train stops, the management device control unit 11 obtains the door opening-side information indicating that vehicle doors on the B side open, from the train. In addition, when the train stops, the management device control unit 11 obtains the open door identification information that identifies open doors, from each vehicle. Then, with respect to a vehicle in which the initial position of the camera corresponding to the open door and the door open information match with the B side, the management device control unit 11 determines a camera, the initial position of which is on the B side, as a display use camera.

With respect to a vehicle in which the initial position of the camera corresponding to the open door and the door opening-side information do not match with the B side, the management device control unit 11 determines a camera, the initial position of which is on the A side, as a display use camera.

EXAMPLE 2

Example 1 focused on the vehicle number 1 in which the first vehicle has not changed direction. Example 2 will focus on the vehicle number 4 in which the first vehicle has changed direction. Also in Example 2, the management device 10 determines the logical position of each camera by using the first vehicle information and door opening-side information within the vehicle information 12a and using the vehicle side lamp information. In Example 2, it is assumed that the first vehicle is vehicle number 4 in the vehicle information 12a in FIG. 5. Except this, FIG. 5 in Example 2 is the same as FIG. 5 in Example 1.

First, the management device control unit 11 checks the vehicle number of the first vehicle in the vehicle information 12a. As described above, in Example 2, the first vehicle in the vehicle information 12a is the vehicle with vehicle number 4.

Next, with respect to the vehicle with vehicle number 4 which is the first vehicle, the management device control unit 11 determines whether the door opening side (B side in the example of FIG. 5) indicated by the door opening-side information in the vehicle information 12a, and the initial position A1 of the camera 41 corresponding to the vehicle side lamp 4 turned on match with the B side. In this case, the two do not match, so that the vehicle with vehicle number 4 changed direction.

Next, the management device control unit 11 determines whether the initial position of the camera corresponding to the vehicle side lamp 4 turned on in each of the vehicles with vehicle number 3 and subsequent vehicle numbers (in this example, vehicle number 3, vehicle number 2, and vehicle number 1), and the initial position of the camera 41 corresponding to the vehicle side lamp 4 turned on in the vehicle number 4, which is the first vehicle, match with the A side or with the B side. When they match, the vehicle is headed in the same direction as the first vehicle and changed direction. When they do not match, the vehicle has not changed direction.

In the example of FIG. 5, the vehicle side lamp 4 corresponding to the camera 31 is turned on in the vehicle number 3. The initial position of the camera 31 is A1 which matches A1, which is the initial position of the camera 41 of the first vehicle, in terms of the A side. Thus, the vehicle with vehicle number 3 changed direction.

Further, the vehicle side lamp 4 corresponding to the camera 23 is turned on in the vehicle number 2. The initial position of the camera 23 is B1 which does not match A1, which is the initial position of the camera 41 of the first vehicle, with the B side. Thus, the vehicle with vehicle number 2 has not changed direction.

Further, the vehicle side lamp 4 corresponding to the camera 13 is turned on in the vehicle number 1. The initial position of the camera 13 is B1 which does not match A1, which is the initial position of the camera 41 of the first vehicle, with the B side. Thus, the vehicle with vehicle number 1 has not changed direction.

Next, similarly to Example 1, with respect to a vehicle that has not changed direction, the management device control unit 11 defines the initial position directly as the logical position. Further, with respect to vehicles having changed direction, the management device control unit 11 defines B1 to Bn as the logical position for a vehicle whose initial position is A1 to An, and An to A1 as the logical position for a vehicle whose initial position is B1 to Bn.

Then, similarly to Example 1, the management device control unit 11 determines the camera 2, whose logical position is located on the door opening side (B side in the example of FIG. 5) of the vehicle information 12a, as the camera to be used for display. In the example of FIG. 5, the management device control unit 11 determines the cameras 42 and 41 for the vehicle number 4, the cameras 31 and 31 for the vehicle number 3, the cameras 23 and 24 for the vehicle number 2, and the cameras 13 and 14 for the vehicle number 1, as the cameras to be used for display.

Further, similarly to Example 1, the management device control unit 11 stores the use camera position which is the position of the camera determined to be used for display, into the management device storage unit 12. In the example of FIG. 5, for example, the management device control unit 11 associates the vehicle 4-B2 and the vehicle 4-B1 with the camera 13 and the camera 14, respectively, which are determined to be used for display, and stores the information in the management device storage unit 12 as the use camera position.

Similarly to Example 1, the display device 30 refers to the management device storage unit 12 to obtain the camera position, which is the position of each of the cameras to be used for display in each vehicle, as well as the IP addresses corresponding to the cameras. Then, the display device 30 obtains image data from the cameras of the obtained IP addresses, and displays the obtained image data according to the obtained camera positions.

EXAMPLE 3

In Example 3, the management device 10 determines the logical position by using the door opening-side information and the vehicle side lamp information, without using the first vehicle information (train traveling direction information). In Example 3, the first vehicle information may not be present in the vehicle information 12a of FIG. 5. Except this, FIG. 5 in Example 3 is the same as FIG. 5 in Example 1.

First, the management device control unit 11 determines whether the door opening side (B side in the example of FIG. 5) indicated by the door opening-side information in the vehicle information 12a, and the initial position of the camera 2 corresponding to the vehicle side lamp 4 turned on match with the B side. When they match, the vehicle has not changed direction. When they do not match, the vehicle has changed direction.

In the example of FIG. 5, the vehicle side lamp 4 corresponding to the camera 13 is turned on in the vehicle number 1. The initial position of the camera 13 is B1, which matches the door opening side B indicated by the door opening-side information in terms of the B side. Thus, the vehicle with vehicle number 1 has not changed direction.

Next, the vehicle side lamp 4 corresponding to the camera 23 is turned on in the vehicle number 2. The initial position of the camera 23 is B1, which matches the door opening side B indicated by the door opening-side information in terms of the B side. Thus, the vehicle with vehicle number 2 has not changed direction.

Next, the vehicle side lamp 4 corresponding to the camera 31 is turned on in the vehicle number 3. The initial position of the camera 31 is A1, which does not match the door opening side B indicated by the door opening-side information in terms of the A side. Thus, the vehicle with vehicle number 3 has changed direction.

Next, the vehicle side lamp 4 corresponding to the camera 41 is turned on in the vehicle number 4. The initial position of the camera 41 is A1, which does not match the door opening side B indicated by the door opening-side information, in terms of the A side. Thus, the vehicle with vehicle number 4 has changed direction.

Next, similarly to Example 1, with respect to a vehicle that has not changed direction, the management device control unit 11 defines the initial position corresponding to the vehicle number of the vehicle directly as the logical position. Further, with respect to vehicles having changed direction, the management device control unit 11 defines Bn to B1 as the logical position for a vehicle whose initial position is A1 to An, and An to A1 as the logical position for a vehicle whose initial positions is B1 to Bn.

Then, similarly to the Example 1, the management device control unit 11 determines the camera 2 whose logical position is located on the door opening side (B side in the example of FIG. 5) of the vehicle information 12a, as the camera to be used to display. In the example of FIG. 5, the management device control unit 11 determines the cameras 13 and 14 for the vehicle number 1, the cameras 23 and 24 for the vehicle number 2, the cameras 32 and 31 for the vehicle number 3, and the cameras 42 and 41 for the vehicle number 4, as the cameras to be used for display.

Further, similarly to Example 1, the management device control unit 11 stores the use camera position, which is the position of the camera determined to be used for display, into the management device storage unit 12.

The display device 30 refers to the management device storage unit 12 to obtain the positions of cameras used in each vehicle as well as the IP addresses of the cameras, similarly to Example 1. Then, the display device 30 obtains image data from the cameras of the obtained IP addresses, and displays the obtained image data according to the obtained positions.

According to the present embodiment, at least the following effects can be obtained.

(A1) Door opening-side information is obtained when a train stops. Then, open door identification information that identifies the open door is obtained upon the train stopping. After that, with respect to a vehicle in which the initial position of the door open camera corresponding to the open door identified by the open door identification information, and the door opening-side information match with the B side, a camera whose initial position is on the B side is determined as a display use camera. With respect to a vehicle in which the initial position of the door open camera and the door opening-side information do not match with the B side, a camera whose initial position is on the A side is determined as a display use camera. With this configuration, it is possible to easily display images captured in the open door vicinity even in a train unit including a vehicle that has changed direction.

For example, there is no need to change the settings such as IP addresses. Thus, the setting work can be simplified in the vehicle monitoring system operation. Further, the time for starting the vehicle operation system can be reduced. In addition, it is possible to prevent the risk of stopping system operation due to mistakes in the setting work.

(A2) The initial position includes the order of the position of each camera from the top of the train on each of the A side and the B side. With respect to a matching vehicle, the order in the initial position is determined directly as the order of the position of the display use camera in the particular vehicle. With respect to a non-matching vehicle, the order opposite to the order in the initial position is determined as the order of the position of the display use camera. With this configuration, it is possible to display the images of the cameras in order from the top of the train.

(A3) Open door identification information is obtained by using a vehicle side lamp indicating that a vehicle door is open and by detecting the ON state of the vehicle side lamp. With this configuration, it is possible to easily obtain open door identification information.

(A4) A camera that captures images in the open door vicinity is used to detect the ON state of the vehicle side lamp. With this configuration, it is possible to reduce the cost of the vehicle monitoring system.

(A5) The current position of each camera is obtained based on the door opening-side information and the open door identification information. The obtained current position is stored while being associated with the identifier of each camera. After that, when the train stops and when the door opening-side information is B side, a camera the stored current position of which is on the B side is determined as a display use camera. Further, when the door opening-side information is A side, a camera the stored current position of which is on the A side, is determined as a display use camera. With this configuration, it is possible to simplify the process when the train stops next.

While the embodiment of the present invention has been described in detail, the present invention is not limited to the above embodiment, and various changes can be made without departing from the scope of the present invention.

In the above embodiment, the display device is configured to use a network camera having an IP address to obtain the IP address of the camera that captures image data to be displayed, based on the camera related information 12b, from the management device. Then, the display device is configured to obtain live image data from the network camera by using the obtained IP address and display the obtained live image data. However, it is also possible to use a camera having no IP address. In this case, for example, the management device is configured to obtain image data to be displayed from the camera based on the camera related information 12b, and transmit the obtained imaged data to the display device.

Further, in the above embodiment, the management device is placed within the train. However, the management device may be placed outside the train. In this case, the display device within the train obtains information, such as the camera to be used for display, from the management device through wireless communication or other means, and displays the image data obtained from the camera within the train.

REFERENCE SIGNS LIST

1 . . . vehicle,
2 . . . camera,
3 . . . vehicle door,
4 . . . vehicle side lamp,
5 . . . camera,
10 . . . management device,
11 . . . management device control unit,
12 . . . management device storage unit,
12a . . . vehicle information,
12b . . . camera related information,
13 . . . operation display unit,
20 . . . vehicle device,
30 . . . display device, 31 . . . display device control unit,
32 . . . display device storage unit,
33 . . . display unit,
40 . . . recording device,
50 . . . network switch (SW),
110 . . . management device.

The invention claimed is:

1. A vehicle monitoring system that captures and displays the outside of an open door, which is a vehicle door opening upon stopping of a train including a plurality of vehicles in which vehicle doors are provided on both sides (A side and B side) of each vehicle,
the vehicle monitoring system comprising:
a plurality of cameras provided respectively corresponding to a plurality of vehicle doors to capture the outside of each corresponding door;
a management device that determines the camera corresponding to the open door; and
a display device that displays image data captured by the camera corresponding to the open door based on the determination of the management device,
wherein the management device includes a control unit and a storage unit,
wherein the storage unit associates and stores the identifier of each of the plurality of cameras, and the initial position indicating on which side, A side or B side, each of the plurality of cameras is located, and
wherein, after obtaining door opening-side information indicating that a vehicle door on the B side opens when the train stops as well as open door identification information identifying the open door, the control unit determines a camera, the initial position of which is on the B side, as a display use camera, which is the camera to be used for display in the display device, with respect to a matching vehicle in which the initial position of the door-open camera, which is the camera corresponding to the open door identified by the open door identification information, and the door opening-side information match with the B side, while with respect to a non-matching vehicle in which the initial position of the door-open camera and the door opening-side information do not match with the B side, determining a camera, the initial position of which is on the A side, as the display use camera.

2. The vehicle monitoring system according to claim 1, wherein the initial position includes the order of the position of each camera from the top of the train on each of the A side and the B side, and
wherein, with respect to the matching vehicle, the control unit determines the order in the initial position directly as the order of the position of the display use camera in the particular vehicle, while with respect to the non-matching vehicle, determining that the order opposite to the order in the initial position is the order of the position of the display use camera in the particular vehicle.

3. The vehicle monitoring system according to claim 1, wherein an A-side vehicle side lamp, which indicates that the vehicle door on the A side is open, is provided corresponding to the vehicle door on the A side in each vehicle, and a B-side vehicle side lamp, which indicates that the vehicle door on the B side is open, is provided corresponding to the vehicle door on the B side in each vehicle, and
wherein the control unit obtains the open door identification information by detecting the ON state of the A-side vehicle side lamp or the B-side vehicle side lamp.

4. The vehicle monitoring system according to claim 3, wherein the control unit uses any of the plurality of cameras to detect the ON state of the A-side vehicle side lamp or the B-side vehicle side lamp.

5. The vehicle monitoring system according to claim 1, wherein the control unit obtains the current position of the plurality of cameras based on the door opening-side information and the open door identification information, associates and stores the obtained current position and the identifier of the plurality of cameras into the storage unit, and when the door opening-side information is B side when the train stops, determines the camera, the stored current position of which is on the B side, as the display use camera, while determining the camera, the stored current position of which is on the A side, as the display use camera when the door open information is A side.

6. A management device used for a vehicle monitoring system that captures and displays the outside of an open door, which is a vehicle door opening upon stopping of a train including a plurality of vehicles in which vehicle doors are provided on both sides (A side and B side) of each vehicle,
the management device comprising a control unit and a storage unit,
wherein the storage unit associates and stores the identifier of each of a plurality of cameras provided corresponding to each of a plurality of vehicle doors to capture the outside of the corresponding vehicle door, and the initial position indicating on which side, A side or B side, each of the plurality of cameras is located, and
wherein, after obtaining door opening-side information indicating that the vehicle door on the B side opens when the train stops as well as open door identification information identifying the open door, the control unit determines a camera, the initial position of which is on the B side, as a display use camera, which is the camera to be used for display, with respect to a matching vehicle in which the initial position of door-open camera, which is the camera corresponding to the open door identified by the open door identification information, and the door opening-side information match with the B side, while determining a camera, the initial position of which is on the A side, as the display use camera, with respect to a vehicle in which the initial position of the door-open camera and the door opening-side information do not match with the B side.

7. A monitoring method in a vehicle monitoring system that captures and displays the outside of an open door, which is a vehicle door opening upon stopping of a train including a plurality of vehicles in which vehicle doors are provided on both sides (A side and B side) of each vehicle,
the monitoring method comprising:
a storing step for associating and storing the identifier of each of a plurality of cameras provided corresponding to each of a plurality of vehicle doors to capture the outside of the corresponding vehicle door, and the initial position indicating on which side, A side or B side, each of the plurality of cameras is located;
an information obtaining step for obtaining door opening-side information indicating that the vehicle door on the B side opens when the train stops as well as open door identification information indicating the open door;

a determination step for determining a camera, the initial position of which is on the B side, as a display use camera which is the camera to be used for display with respect to a vehicle in which the initial position of the door-open camera, which is the camera corresponding to the open door identified by the open door identification information, and the door opening-side information match with the B side, while with respect to a vehicle in which the initial position of the door-open camera and the door opening-side information do not match with the B side, determining a camera, the initial position of which is on the A side, as the display use camera; and a display step for displaying image data captured by the camera determined the display use camera in the determination step.

* * * * *